United States Patent [19]

Cunningham

[11] 3,980,914

[45] Sept. 14, 1976

[54] BRUSHES FOR ROTATING ELECTRIC MACHINES

[75] Inventor: James Cunningham, Glamorgan, Wales

[73] Assignee: Morganite Carbon Limited, England

[22] Filed: Dec. 18, 1972

[21] Appl. No.: 315,781

[30] Foreign Application Priority Data

Dec. 20, 1971 United Kingdom............... 59025/71

[52] U.S. Cl. ................................................ 310/251

[51] Int. Cl.$^2$ ........................................ H02K 13/00

[58] Field of Search ........... 310/245, 248, 249, 250, 310/251, 252, 253, 220, 221, 222, 223

[56] References Cited

UNITED STATES PATENTS

| | | | |
|---|---|---|---|
| 573,105 | 12/1896 | Raymond | 310/248 |
| 716,252 | 12/1902 | Laughlin | 310/248 |
| 2,300,503 | 11/1942 | Hamister | 310/248 |
| 2,739,255 | 3/1956 | Shobert | 310/251 |
| 2,870,353 | 1/1959 | Shobert | 310/248 |
| 3,303,370 | 2/1967 | Boes | 310/252 |
| 3,509,400 | 4/1970 | Conrath | 310/248 |

FOREIGN PATENTS OR APPLICATIONS

| | | | |
|---|---|---|---|
| 573,955 | 4/1959 | Canada | 310/251 |
| 1,057,580 | 3/1954 | France | 310/251 |
| 745,673 | 5/1944 | Germany | 310/251 |

*Primary Examiner*—R. Skudy

*Attorney, Agent, or Firm*—Larson, Taylor and Hinds

[57] ABSTRACT

For use with an electrical machine, a contact brush is provided which comprises a solid "carbon" block having a thin layer of electrically conductive, preferably carbon, fibers on a surface which contains the entering edge, or a surface which contains the leaving edge, or both such surfaces. The fibers have free ends contacting the relatively-moving counterface, e.g. a slip ring or commutator, close to the entering or leaving edge, thereby to provide near the respective edge a large number of contact points to obtain sparkless operation.

4 Claims, 3 Drawing Figures

BRUSHES FOR ROTATING ELECTRIC MACHINES

DESCRIPTION

This invention relates to brushes for electric machines.

A brush of this kind commonly comprises a solid "carbon" block which is usually made from a carbonaceous or graphitic powder bonded with carbonised tar, pitch or resin, and which may contain a high proportion of a metallic powder. It has long been known that arcing occurs in use between the brush and the slip ring or commutator, the severity of arcing being dependent on the condition of the brush and the associated slip ring or commutator and on the operating conditions of the machine.

This invention provides an improved brush use of which militates against arcing.

According to this invention a brush comprises a solid carbon body which has carbon or other electrically-conductive fibres lying against its surface containing the entering edge or the leaving edge, or both such surfaces, the fibres being secured in good electrically-conductive contact with the brush body and having free ends adjacent to the entering or leaving edge, as the case may be, to make flexible contact with cooperating conductor of the electric machine. The term cooperating conductor will, of course, be understood to include a slip ring, a commutator or an equivalent conductor close to that edge.

Carbon fibres, which are preferred because of their high modulus of elasticity and strength, in one arrangement extend in a thin layer over the whole width of the brush, that is the extent of the surface or surfaces which will be parallel to the rotational axis of the slip ring or commutator, and, in another arrangement, are in a thin layer accommodated in a shallow, longitudinal channel in the central part of the surface.

The brushes of this invention have the important advantage as compared with solid brushes not having the fibres that a substantial reduction in arcing is achieved in use both with slip rings and with commutators. Further, as compared with brushes formed wholly of carbon fibres, the brushes of this invention have the advantages that they can be used with existing forms of brush gear without the need to reduce pressing spring pressure below the range of available adjustment, that the contact voltage drop, operational peripheral speed and current rating are substantially the same as for a conventional solid brush, that the usual and operationally desirable patina is produced on the slip ring or commutator whereas a wholly carbon fibre brush would not produce such a patina or would remove any existing patina, and that the losses at a given load current are lower, since the wholly carbon fibre brush would have a substantially higher electrical resistance than an equivalent size of solid brush.

Figure 1:
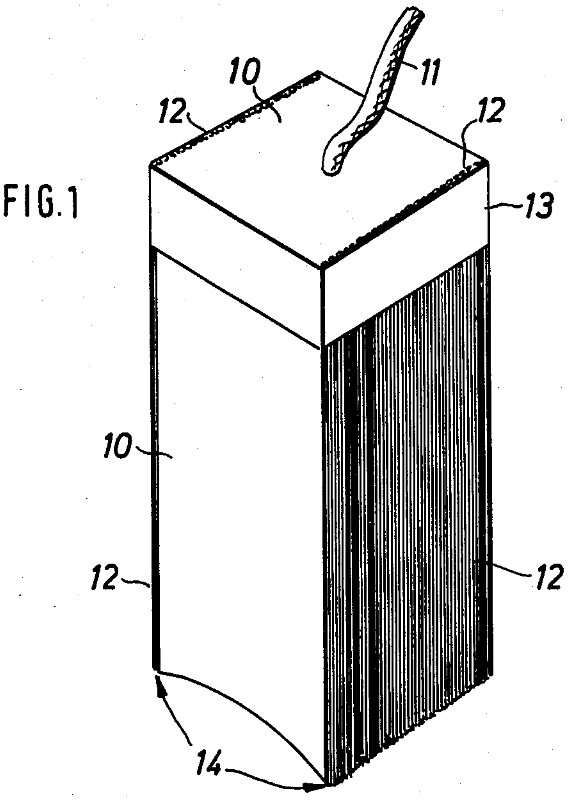
Figure 2:
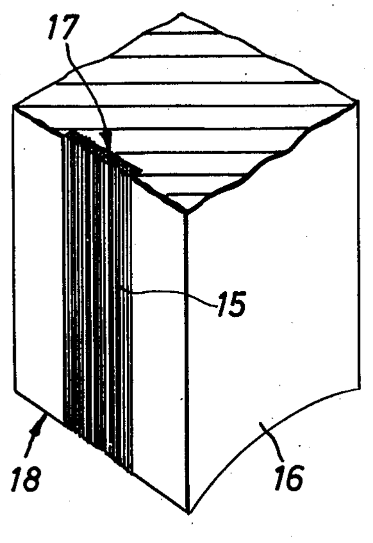
Figure 3:
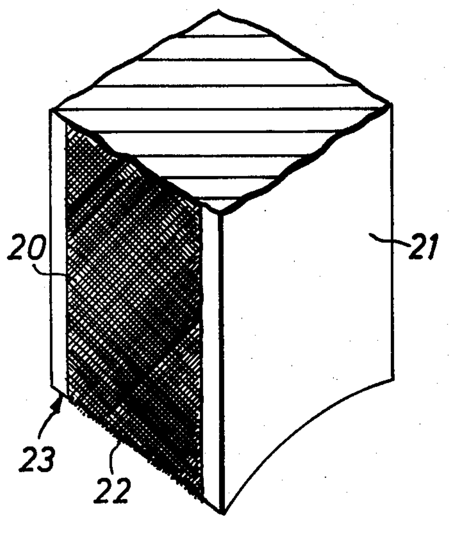

Three forms of brush of this invention are illustrated in the accompanying drawings in which:

FIG. 1 is an illustration of a first form having carbon fibres overlying two surfaces, FIG. 2 is a view of a second form having carbon fibres accommodated in a shallow channel, and FIG. 3 shows a third arrangement.

The brush of FIG. 1 has a main current-carrying portion 10 of conventional solid block form having a conductor 11 of braided copper electrically joined to its terminal end. Each of the axially-extending surfaces of the block, that is those surfaces which are parallel to the rotational axis of the machine with which the brush is to be used, is overlain over its whole width by a fringe-like layer 12 of carbon fibres. Each layer 12 is secured to the terminal end of the block 10 in good electrical contact with it by a layer 13 of material such as a metal or a silver-loaded epoxy resin. The fibres extend freely from the layer 13 lengthwise of the brush to the entering and leaving edges 14 of the contact face of the brush. Thus in use the free ends of the fibres sweep along the slip ring or commutator just ahead of and immediately behind the entering edge and leaving edge, respectively, so carrying a fraction of the current. The main block 10 should carry at least 50% of the main load current but more desirably 75% or more and preferably 95%.

In FIG. 2, the carbon fibres 15 overlying the face of block brush 16 are accommodated in a centrally-disposed, shallow, longitudinally-extending channel 17. The fibres have free ends close to the entering or leaving edge 18 of the brush and their opposite ends secured in good electrical contact with the block 16.

In FIG. 3, the fibres are woven into a tape, braid or cloth 20 which is secured in good electrical contact with the brush block 21 at one end and has its opposite end of "frayed" form so that free ends 22 of its fibres contact the slip ring or commutator near the entering or leaving edge 23 of the block.

In other forms, the fibres are secured in contact with the block over a major part of the lengths, being free only over a minor part adjacent the entering or leaving edge, and in yet other forms the fibres extend part way only along the block from such edges.

I claim:

1. A brush for an electric machine, which brush comprises a solid carbon body which has an end contact surface with an entering edge and a leaving edge and has electrically-conductive fibres lying against and extending lengthwise of at least one of the lengthwise extending surfaces of the brush containing the entering edge and the leaving edge, respectively, the fibres being secured at their ends remote from the respective one of said edges in good electrically-conductive contact with the brush body and having their opposite ends adjacent to the respective one of the entering and leaving edges and free from the body to make flexing contact in use close to that edge with a cooperating conductor of said electric machine.

2. A brush according to claim 1, wherein the electrically-conductive fibres extend in a thin layer over the respective lengthwise-extending surface of the whole width of the brush.

3. A brush according to claim 1, wherein the electrically-conductive fibres are in a thin layer accommodated in a shallow longitudinal channel in the central part of the respective lengthwise-extending surface.

4. A brush as claimed in claim 1, wherein the said electrically conductive fibres comprise carbon fibres of high modulus of elasticity and strength.

* * * * *